United States Patent
Smith et al.

(10) Patent No.: US 6,771,305 B2
(45) Date of Patent: Aug. 3, 2004

(54) DETECTING A FREQUENCY OF OSCILLATING SCENE ILLUMINATION IN ELECTRONIC IMAGE CAPTURE

(75) Inventors: Ronald D. Smith, Phoenix, AZ (US); Gregory W. Starr, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/324,891

(22) Filed: Dec. 20, 2002

(65) Prior Publication Data

US 2003/0090566 A1 May 15, 2003

Related U.S. Application Data

(63) Continuation of application No. 09/123,496, filed on Jul. 28, 1998, now Pat. No. 6,501,518.

(51) Int. Cl.[7] .............................................. H04N 7/18
(52) U.S. Cl. ..................................... 348/84; 348/222
(58) Field of Search ..................... 375/240.01–240.29; 348/82–84, 222–224

(56) References Cited

U.S. PATENT DOCUMENTS

| | | | |
|---|---|---|---|
| 5,495,313 A | | 2/1996 | Kai |
| 5,548,398 A | | 8/1996 | Gaboury |
| 5,548,399 A | * | 8/1996 | Takai et al. ................. 356/218 |
| 5,925,875 A | * | 7/1999 | Frey ......................... 250/208.1 |
| 5,960,153 A | * | 9/1999 | Oster et al. ................. 386/117 |

FOREIGN PATENT DOCUMENTS

| | | |
|---|---|---|
| EP | 0506031 | 9/1992 |
| JP | 6209427 | 7/1994 |
| JP | 9065198 | 3/1997 |
| JP | 10136267 | 5/1998 |

* cited by examiner

*Primary Examiner*—Andy Rao
(74) *Attorney, Agent, or Firm*—Blakely, Sokoloff, Taylor & Zafman LLP

(57) ABSTRACT

A method for eliminating the flicker of a light source such as a florescent light having the first step of setting a first frame rate for the capture of a series of frames. Then, setting a capture integration period to a first integration period, and capturing a set of frames under an illumination source with a first frequency. Thereafter, determining the first frequency of the illumination by using a Fourier transform (FFT) of the set of captured frames. What is also disclosed is an apparatus for performing the above method having an image sensor and a capture control unit coupled to the image sensor.

22 Claims, 8 Drawing Sheets

DETECTING A FREQUENCY OF OSCILLATING SCENE ILLUMINATION IN ELECTRONIC IMAGE CAPTURE

This Application is a Continuation of Ser. No. 09/123,496, filed on Jul. 28, 1998 and now U.S. Pat. No. 6,501,518.

FIELD OF THE INVENTION

The present invention relates to the field of use of digital video capture. More particularly, the present invention relates to method and apparatus for eliminating flicker effects from discharge lamps during pipelined digital video capture.

DESCRIPTION OF RELATED ART

Digital cameras are currently being used in many applications, including both still image and video acquisition. To acquire images, digital cameras utilize a sensor array made up of an arranged pattern of photodiodes (i.e., light sensitive diodes, or, photosensors). Each photodiode measures the amount of light it receives by storing a corresponding amount of charge on an integrated capacitor. The amount of charge stored by each photodiode is then converted into a digital value by an analog-to-digital converter such that all the digital values, after being converted and reassembled into a particular array, can be processed to arrive at a digital image.

Typically, the photosensor array is exposed to the scene to be captured through the use of either a mechanical or electronic shutter that allows either (1) light to fall upon the photosensor array, or (2) charge to accumulate on each photosensor in the array, respectively. The photosensor array can either capture the charge in a row-by-row fashion as in the latter case, or, alternatively, in the former case, the image can be captured as a whole (i.e., the photosensor array is exposed to a light source all at once). The processing of the charges which are stored on each of the photosensors is then performed either in a row-by-row fashion, or in a pixel-by-pixel fashion. Images captured in this row by row fashion is termed to be captured in a "pipelined" mode of operation. For video image capture applications, a series of frames (i.e., images) are captured similar to the manner above.

As digital cameras are positioned to replace traditional film-based cameras, they must be capable of operating under a variety of lighting situations. For example, digital cameras must be able to capture videos of scenes which are illuminated by sunlight, if outdoors, or which are illuminated by incandescent or fluorescent lights, if indoors.

However, when capturing a sequence of frames under an environment lighted by a discharge lamp (e.g., a fluorescent light), the digital video will contain artifacts due to the fact that the discharge lamp can vary in intensity and color temperature as a function of time. Thus, discharge lamps such as fluorescent lights does not offer a constant intensity of light but instead offers an intensity which, if measured and plotted on a chart, resembles a full wave rectified sine wave.

FIG. 1 shows an example of the intensity of fluorescent lighting as it varies over time, where the Y-axis represents the intensity of the light sensed by the photodiode, and the X-axis represents the passage of time. As can be seen by FIG. 1, the intensity of the light generated by fluorescent lighting (and thus sensed by the photodiode) is periodic and resembles the absolute values of a sine wave. As the variation of the intensity is a function of time, a video stream that is captured in this lighting will include a potentially considerable amount of variation in the quality of the captured video as the capture is also a function of time.

The problem is also compounded in the fact that the variation in the intensity of the fluorescent lighting is different in different parts of the world as some countries use a 60 Hz alternating current (AC) power system and other countries use a 50 Hz AC power system. For example, the United States uses an AC power system which oscillates at 60 Hz. Thus, depending on the country in which the digital camera is used, the frame capture rate will have to be adjusted such that the frame capture rate is a function of the operating cycle of the power supply.

One approach that allows a digital camera to function under the fluorescent lighting of different power systems is to have the user enter a code designating the country in which the digital camera will be used. The camera would then adjust the frame capture rate according to the operating frequency of the country. The camera would maintain a list of correspondences between the regions in which it is currently operating and also what power system is functional in that region. Also, this approach will require the user to input a code every time a user entered a region with a different power system. Thus, this approach would require that the user manually enter the user's current location.

A second approach would be to incorporate a system into the camera itself, such as a global positioning system (GPS), which would allow the camera to be "self-aware" as to which geographic location it is in and thus automatically sets the camera's internal systems accordingly. However, this approach would require additional circuitry which would place additional power and cost requirements into the digital camera.

Yet another approach would be to include circuitry to have the camera automatically recognize the power system in which it is currently operating by having the user plug the camera into the power system of the country. For example, when a user reaches a certain location or a new region, the user would simply plug the camera into a wall outlet to allow the circuitry of a digital camera to register the operating cycle of the power system. However, this approach is also not recommended as different regions around the world usually have different configurations of wall sockets and connectors on those sockets such that the user would have to carry along a set of adapters, which could number into the tens or hundreds, to be sure that the user can plug the digital camera into the power system.

It would be preferable to have a system which eliminates the effects of using fluorescent lighting that does not require user intervention or increased cost and power requirements on the camera itself.

What is disclosed is a method having the first step of setting a first frame rate. Then, setting a capture integration period to a first integration period, and capturing a set of frames under an illumination source with a first frequency. Thereafter, determining the first frequency of the illumination. What is also disclosed is an apparatus for performing the above method having an image sensor and a capture control unit coupled to the image sensor.

DETAILED DESCRIPTION OF THE INVENTION

The present invention provides a method and apparatus for reducing the effects of flicker from discharge lamps in a captured video stream. For purposes of explanation, specific embodiments are set forth to provide a thorough understanding of the present invention. However, it will be understood by one skilled in the art, from reading this disclosure, that the invention may be practiced without these details. Further, although the present invention is described through the use of a CMOS image sensor, most, if not all, aspects of the invention apply to image sensors in general. Moreover, well-known elements, devices, process steps and the like are not set forth in detail in order to avoid obscuring the present invention.

As the intensity and color value output from a fluorescent lamp varies in a sinusoidal, therefore periodic fashion, due to the applied AC voltage, the present invention utilizes the image sensor to sample the overall illumination to detect whether the system operating in a 50 Hz, 60 Hz or incandescent light situation. Then, integration is performed by the image sensor under different constraints based on the detected light frequency. The timing allows the photosensor array to capture each frame at approximately the same time in the cycle of the oscillation of the light intensity received from the fluorescent lamp.

Figure 1:
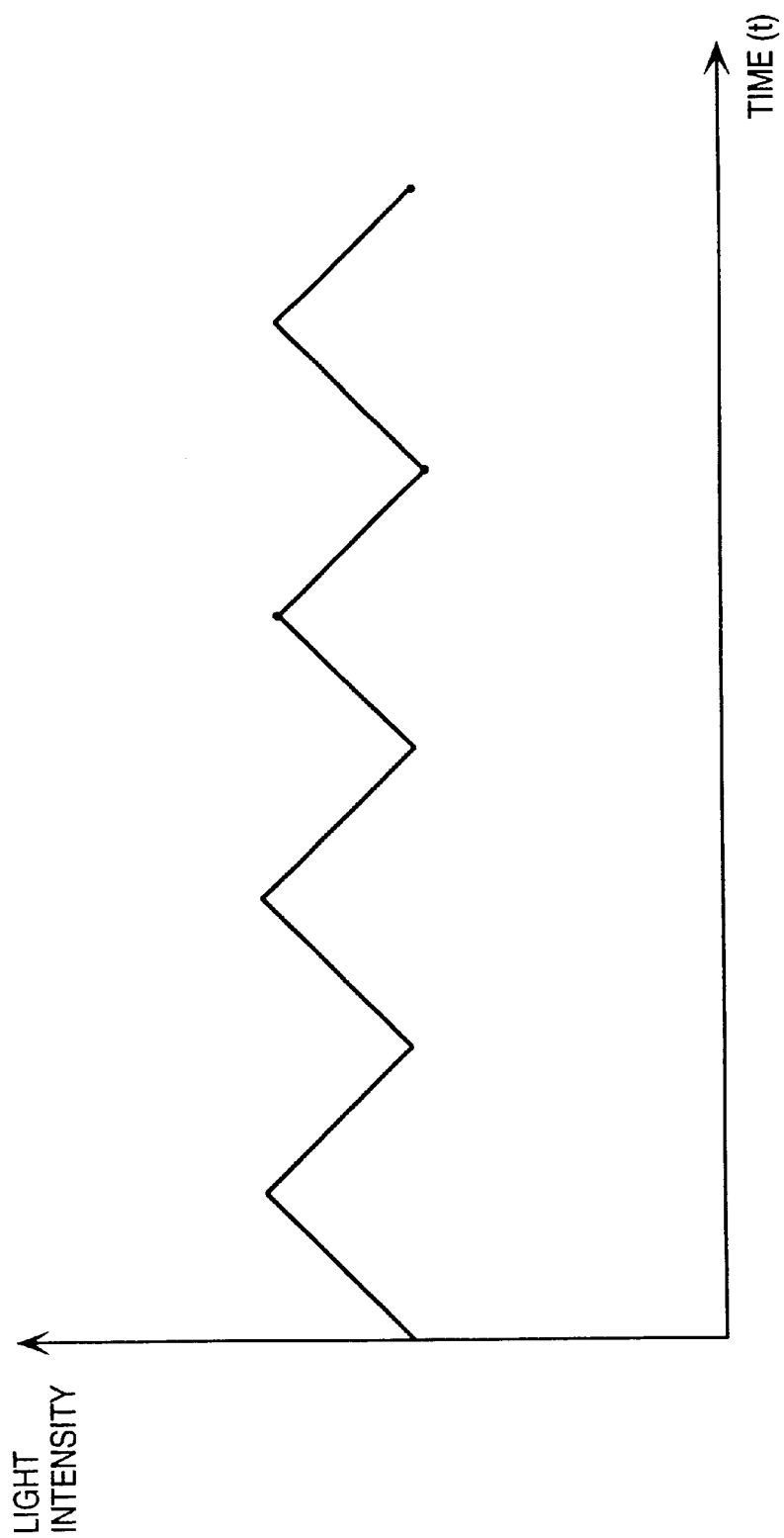
FIG. 1 is a plot of the light intensity from a discharge lamp measured over time.
Figure 2:
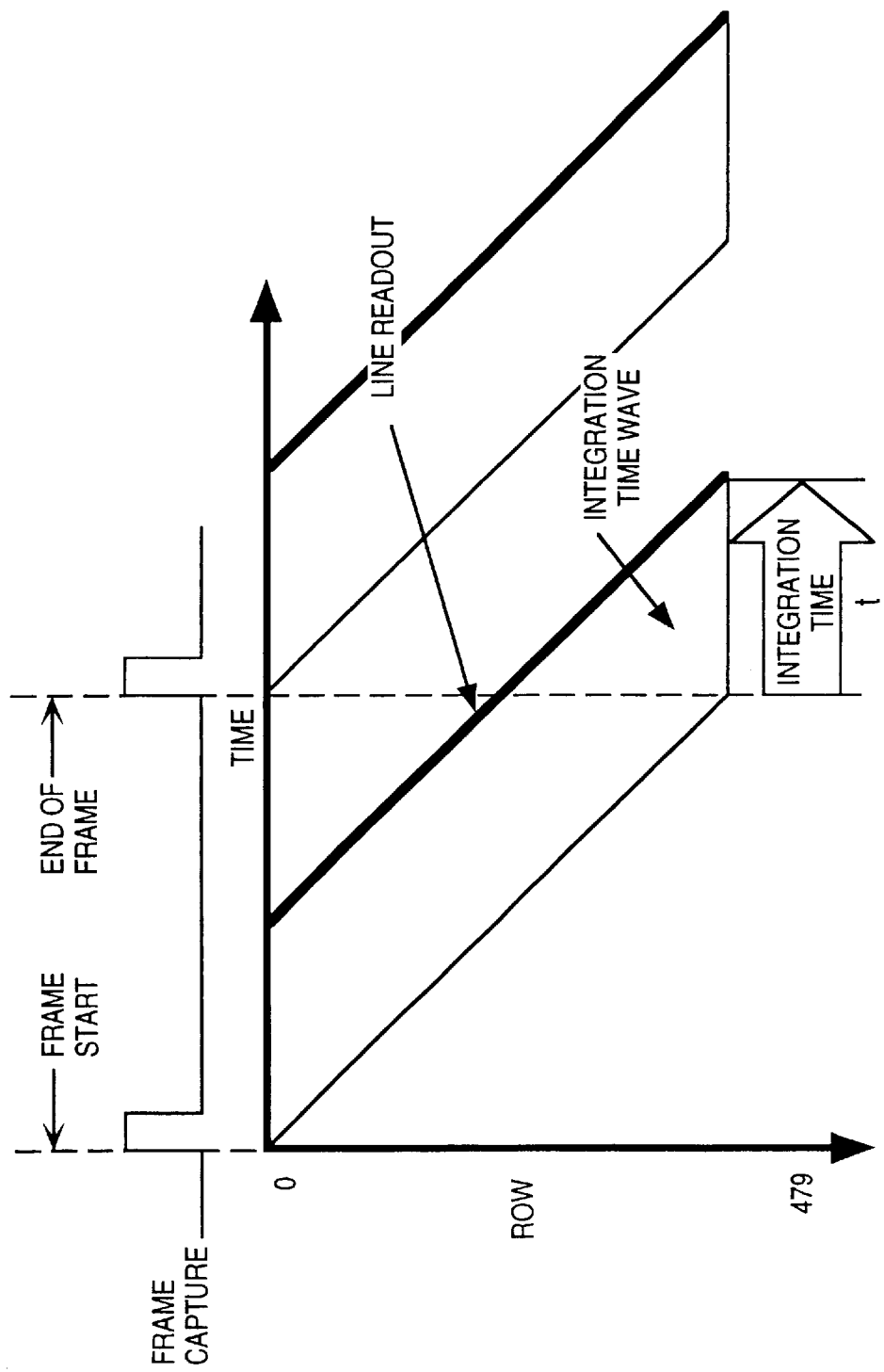
FIG. 2 illustrates the sampling of image data over time using a pipelined image sensor.

FIG. 2 is a diagram of the sampling of image data over time using a pipelined image sensor. The frame capture begins at time 0 when a frame capture signal is asserted. During capture, each row receives a RESET signal which allows the row to begin integration. In one embodiment, all rows have an integration time "t" which is constant for each row. After integration time t, a line readout signal is provided to the particular row of the sensor to read out the integrated value which represents the image data for that particular row for each pixel in that row. In the example shown in FIG. 2, the image sensor contains 480 lines of resolution, which means that there are 480 rows of pixel sensors. As soon as the integration time period has elapsed, each row of pixel sensor values are read out for processing. After the last row of pixel sensor values are read out, the next frame if captured by having the first row of the image sensor receiving a RESET command. As the image sensor operates in a pipelined mode, as soon as the last row of the image sensor has received a RESET command to initiate capture, a RESET commend to initiate capture for the next, which is the first row of the image sensor, is automatically sent. As shown by FIG. 2, the sampling occurs in the time axis ("X" axis in the diagram), but what is being sampled varies by the row ("Y" axis in the diagram), so the illumination data is intermixed with actual image data.

Figure 3:
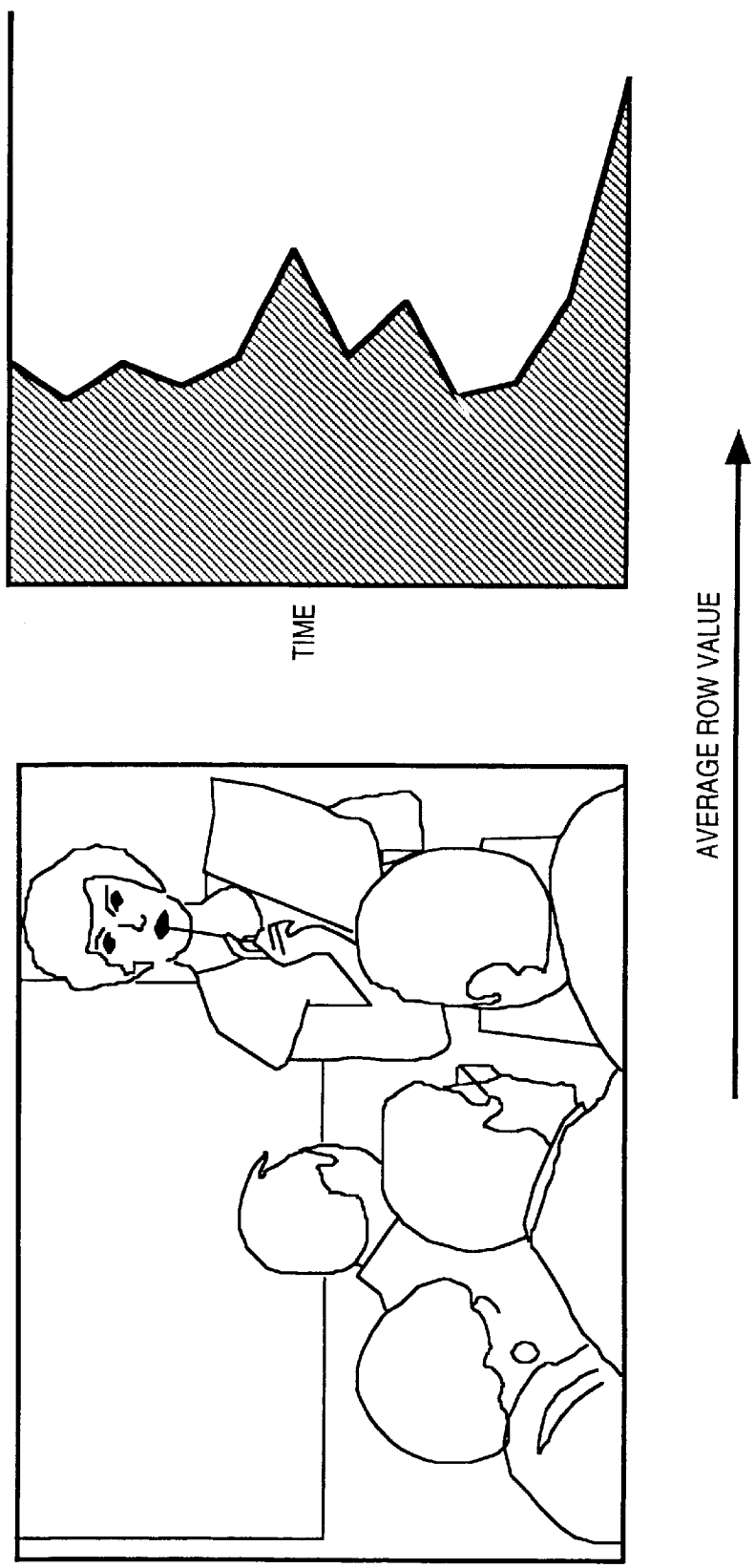
FIG. 3 is a plot of row averaged captured image data over time for a particular captured image.

FIG. 3 is a plot of captured image data for each row which has been averaged (i.e., where the pixel values of each row have been averaged), over time for a particular captured image. As discussed below, the image data is averaged for each row so as to mitigate the effects of choosing a particular column of pixel data to analyze. For example, if the last column of pixel values on the right hand side of the image is selected for analysis, it would yield a very different result, than if the column of pixel data came from the center of the image. By averaging the image data for each row, the actual changes in values due to the "picture" contained in the image has less effect on the actual data which is used for analysis of the illumination of the image.

Figure 4:
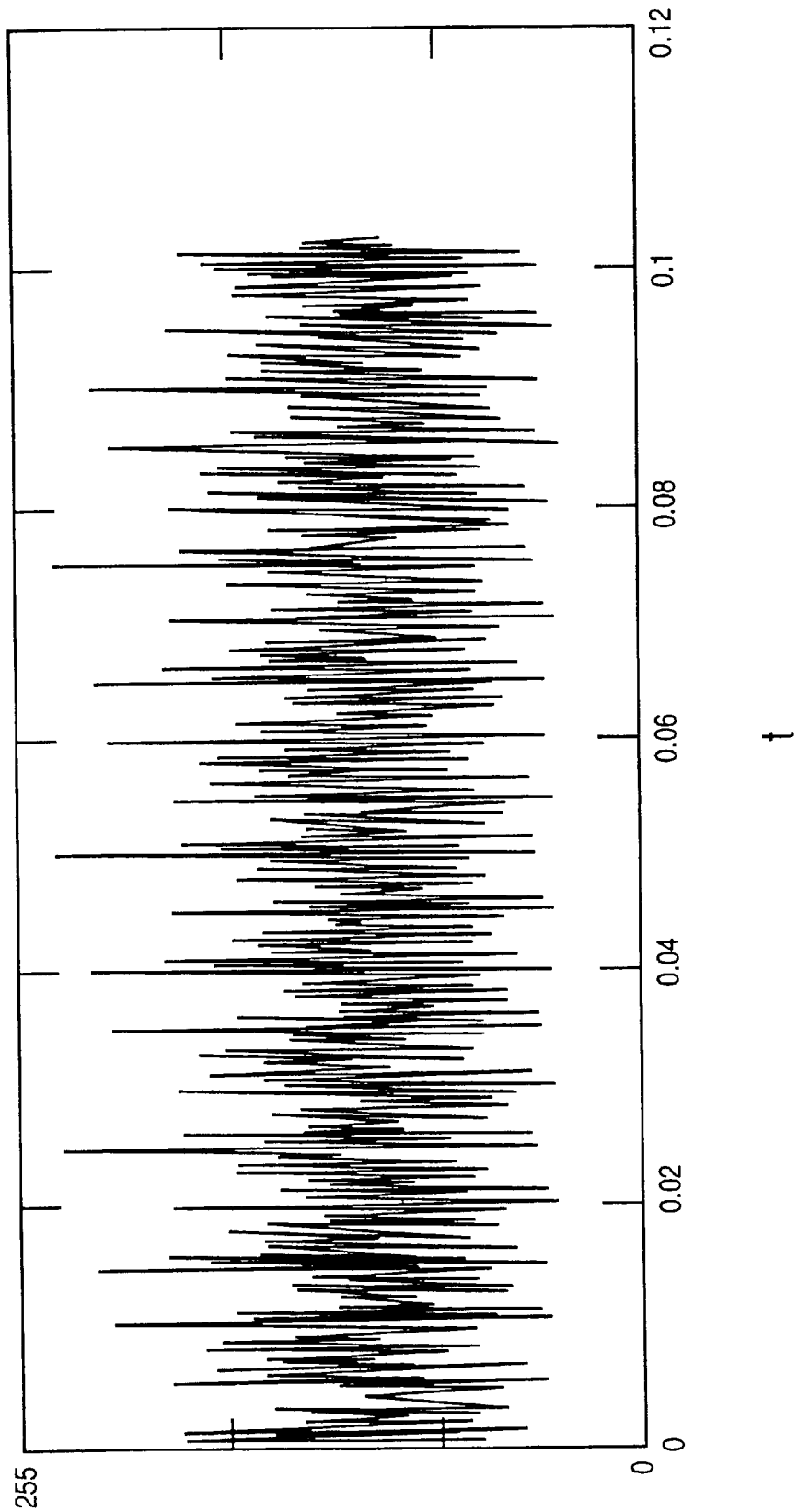
FIG. 4 is a plot of the magnitude of captured illumination, including image data, over time.

FIG. 4 is a plot of the magnitude of captures illumination that is output by the image sensor over time after it has been converted by an analog-to-digital converter. The output illumination data is intermixed in the image data, and, in FIG. 4, both of them are plotted over time. The illumination of light represents the row average of each row as it is being captured. The Y-axis is in units of the output of the analog to digital converter, where, in this embodiment, is an integer from 0 to 255, representing an 8-bit analog-to-digital conversion of the output of the image sensor. In order to determine the frequency of the illumination amplitude oscillation due to florescent lighting in the captured image data, the image data is operated on by a Fourier transform. This is further discussed with FIG. 6, below.

In order to eliminate the capture of the effects of illumination which has oscillating amplitude in image data, it should be noted that the power amplitude Fourier transform of a pulse wave form resembles the absolute value of the sinc function (i.e., $|Sin(X)/X|$) and in particular, this function contains zeros. As the zeros correspond to the illumination flicker, if the integration time is set to the values which correspond to the values at which point the power amplitude of the Fourier transform is equal to zero, then illumination flicker can be eliminated. Thus, depending on whether images are captured under a 50 or 60 Hz illumination, integration time can be set at particular values to eliminate the flicker effects caused by the oscillating level of illumination. In helping to determine the oscillation frequency of the light source, it is necessary that the integration time is chosen so that the amplitude of the effect caused by either the 50 Hz or the 60 Hz light source would be similar.

Figure 5:
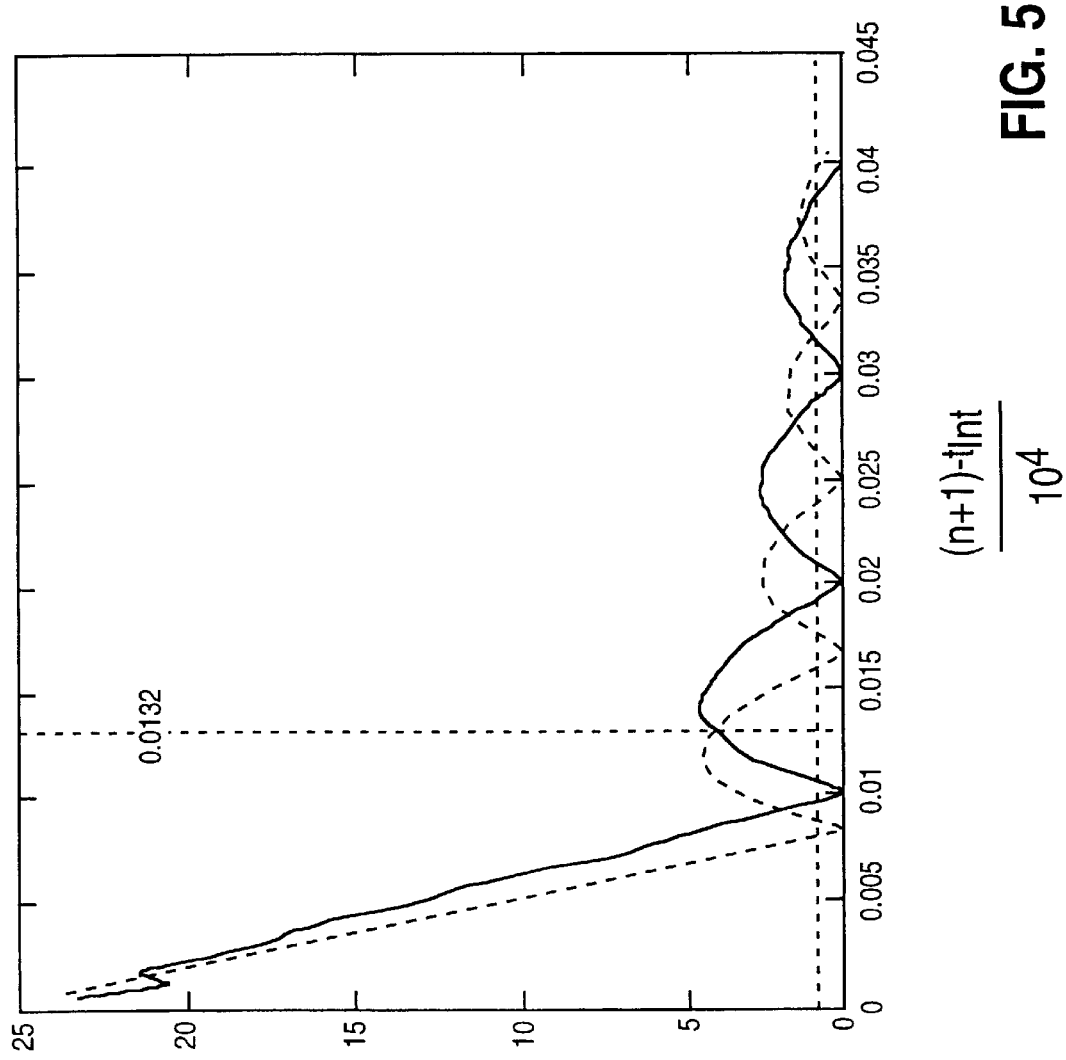
FIG. 5 is a plot of integration time versus flicker amplitude for two light sources at different frequencies.

As can be seen by FIG. 5, there are several places where the plot of the amplitude of the 60 Hz signal wave form is equal to the plot of the amplitude of the 50 Hz signal wave form. In one embodiment, the integration time is set to 0.0132 seconds. The reason why the integration time is set to a value which will result in similar amplitudes for the 50 and 60 Hz frequency is so that the presence of illumination at one frequency can be easily detected. For example, if the integration time was set to 0.017 seconds, where the amplitude of the 50 Hz signal is much greater than the amplitude of the 60 Hz signal, then it would be very hard to detect the effect caused by the 60 Hz signal as it is very close to zero. Table 1 contains a sample list of integration times suitable for determining the oscillation frequency of the light source.

TABLE 1

| Sample Integration Times Seconds |
|---|
| 0.009 |
| 0.0132 |
| 0.0184 |
| 0.0224 |
| 0.0276 |
| 0.0317 |

As discussed above for FIG. 4, the effect of the oscillating illumination of the captured image is contained in the image data. To separate out the illumination effects, a fast-Fourier-transform (FFT) function is performed on the image data to determine the frequency of oscillation, if any, of the illumination.

Figure 6:
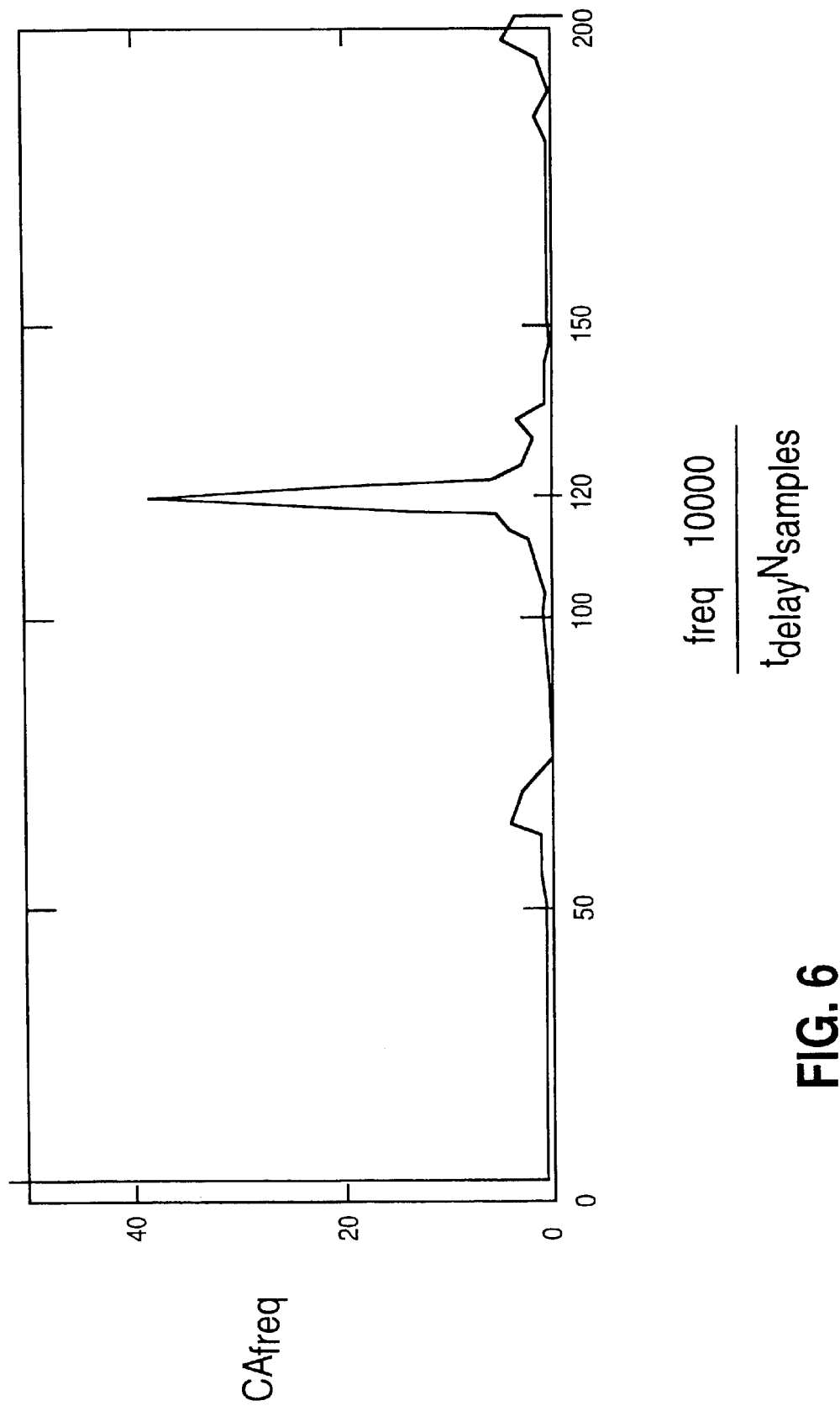
FIG. 6 is a plot of the signal shown in FIG. 4 after a Fourier transform.

FIG. 6 is a plot of the data shown in FIG. 4 after a FFT, assuming that the illumination during the capture of the image data in FIG. 4 is due to a 60 Hz light source. As can be seen in FIG. 6, there is a "spike" that appears at 120 Hz as the illumination data indicates that a 60 Hz power line source was detected. It is to be noted that the spike appears at 120 Hz as the illumination fluctuates at twice the line frequency, which in this case is 60 Hz (i.e., the illumination charges with both the "positive" and "negative" portion of the 60 Hz cycle).

Figure 7:
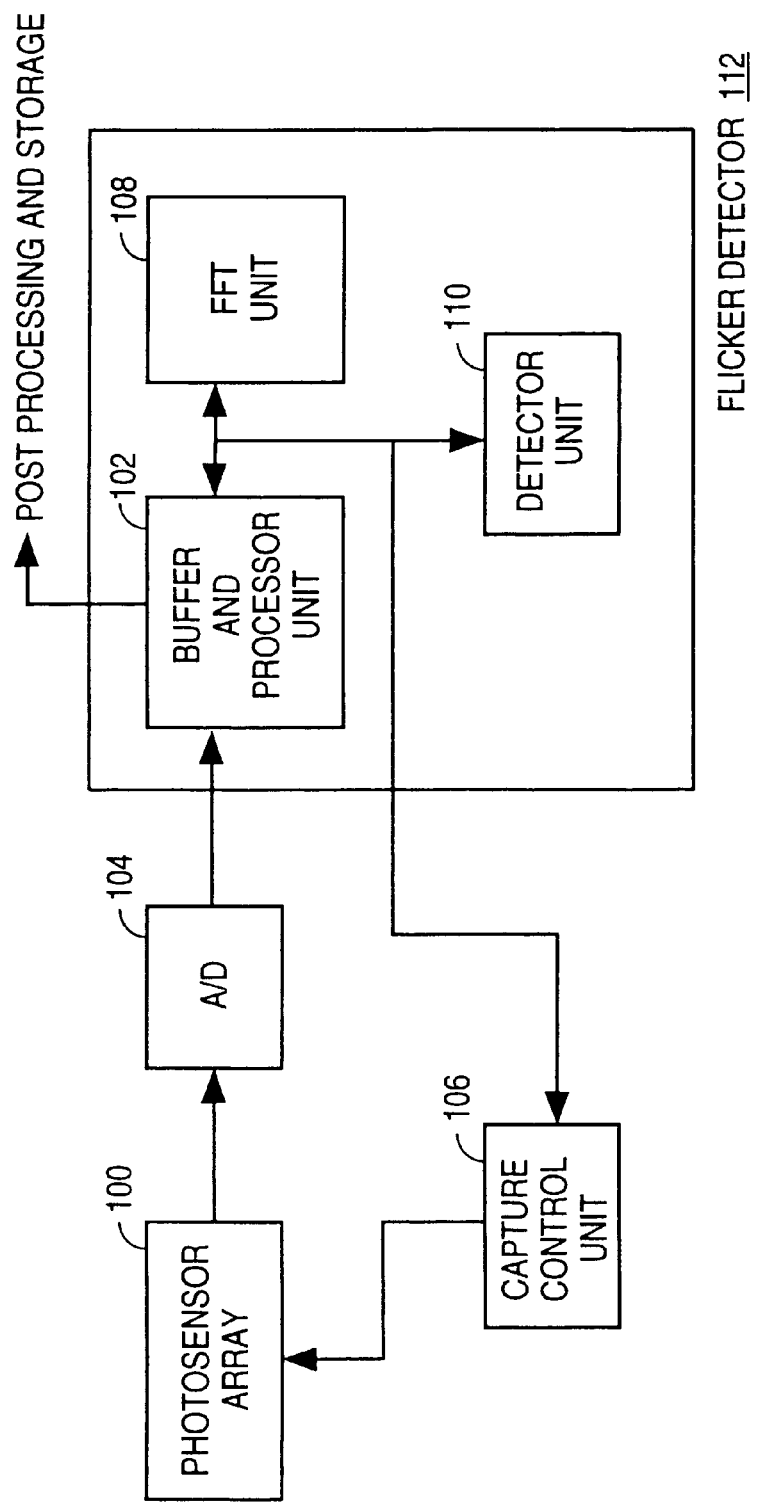
FIG. 7 is an image capture system configured according to one embodiment of the present invention which includes a flicker detector.

FIG. 7 is a block diagram of an image capture and processing system configured in accordance with one embodiment of the present invention with a photosensor array 100, a buffer and processing unit 102, an analog-to-digital (A/D) unit 104, a capture control unit 106, a FFT unit 108, and a detector unit 110. Buffer and processing unit 102, FFT 108, and detection unit 110 make up a flicker detector 112.

Photosensor array 100 is operated in a pipelined mode, which, as discussed above, means that each row of photosensor array 100 is integrated in a row by row basis. The output of photosensor array 100 is fed into A/D unit 104. Specifically, photosensor array 100 outputs the capture charges, based on the control signals sent by capture control unit 106, to A/D unit 104 for processing. Capture control unit 106 is controlled in turn by flicker detector 112. Specifically, once buffer and processing unit 102 receives the captured image data from A/D unit 104, it performs any processing that is necessary and then sends the results to FFT unit 108. FFT unit 108 then operates on the results that are received from buffer and processing unit 102 and then sends the resulting data to detector unit 110. Detector unit 110 then outputs a signal to capture control unit 106 to indicate the lighting condition under which the camera is operating. As described above, buffer and processing unit 102, FFT unit 108, and detector unit 110 make up flicker detector 112.

In one embodiment, at the same time that buffer and processing unit 102 receives data from A/D unit 104, buffer and processing unit 102 provides the same information to post processing and storage units (not shown). The post processing and storage units can include units for providing further image processing, such as compression or image enhancement. The storage component in the post processing and storage units can be any media suited for storing digital data. In one embodiment, the storage unit is a non-volatile memory such as magnetic media. However, any storage facility used for storing digital data will be suited, whether it is volatile or non-volatile memory. In other embodiments, the functions provided by flicker detector 112 can be implemented together with the functions provided by the post processing and storage units. In addition, it should be noted that the functions of flicker detector 112, along with the functions provided with the processing and storage units, can be provided by a general purpose computer that provides the general purpose processor and storage units as described above. Thus, the actual implementation of the processing and storage units described in FIG. 7 can be implemented in a variety of solutions, whether they are in hardware or software.

Figure 8:
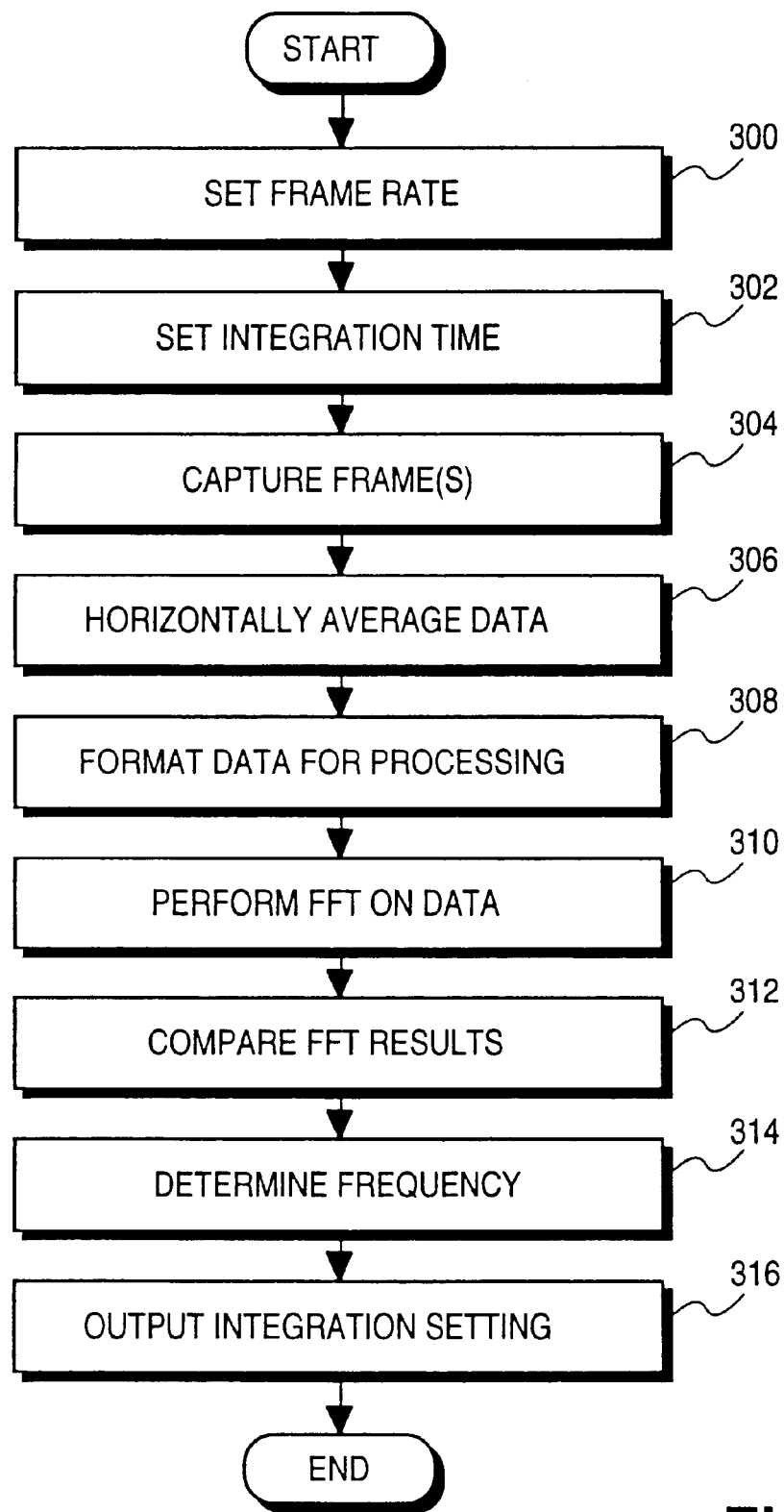
FIG. 8 is a flow diagram of the operation of the image capture system including the flicker detector.

FIG. 8 is a flowchart of one embodiment of the operation of the present invention. The process begins with step 300, during which capture control unit 106 is set to capture one or more frames using photosensor array 100 at a particular frame rate. The minimum frame rate is dependent on the total number of data samples to be acquired. The sampling rate and total number of samples are selected to avoid undersampling. The exact sampling requirements may be varied over an almost limitless range providing Nyquist resolution is maintained. In one embodiment, the frame rate is set to recover at least 120 Hz, which is double the frequency rate of any encounterable florescent light (i.e., double the highest encounterable power supply line frequency, which is 60 Hz). This is to ensure that the changes in illumination would be captured as the capture frequency has to be high enough to avoid Nyquist effects due to undersampling.

Undersampling is not usually a problem, as each line in photo sensor array 100 captures one "sample" of illumination. For example, assuming typical frame rates of 15 frames per second, even if photo sensor array 100 only has 16 lines of resolution, there would be enough samples to satisfy Nyquist resolution of 240 Hz to recover 120 Hz.

In step 302, the integration time is set to approximately 13.2 milliseconds. As described above, this integration time has been chosen to allow capture of illumination from either the 60 Hz or 50 Hz light source to be at the same amplitude. Operation then proceeds with step 304.

In step 304, one or more frames are captured by photosensor array 100 at the integration time set by capture control unit 106 as in step 302 (i.e., 13.2 milliseconds). Specifically, the integration time used for each row is 13.2 milliseconds.

In step 306, the captured image data for each row of the frame is horizontal averaged. As described above, the averaging of the image data for each pixel in a row decreases the effects of having a dark object or a light object in the scene so that any illumination fluctuations caused by a florescent light may be detected more easily. For example, if the images being captured are completely uniform in image data, such as a completely white picture, then any changes in illumination may be easily detected. Without averaging, choosing a random column pixel causes unpredictable results depending on which column of photosensor array 100 is chosen. The resulting data would be similar to the data in FIG. 4.

In step 308, if more than one frame has been captured, and, assuming that the interframe gap is equal to zero (i.e., frames are captured successively without a pause), the horizontally averaged image data can be "stitched" together to form a continuous series of horizontally averaged image data. Operation will then continue with step 310.

In step 310, a fast-Fourier-transform (FFT) is performed on the image data by FFT unit 108. As discussed above, performing the FFT on the horizontally averaged image data from step 308, the results will be as shown in FIG. 6, for example (where the line frequency is 60 Hz). It is to be noted that as long as there is enough data to resolve 120 Hz, then 100 Hz may also be resolvable. Operation will then continue with step 312.

In step 312, the value of the FFT on the 100 Hz value is compared with the value at 120 Hz value. In step 314, detector unit 110 determines whether the value for the 60 Hz value (i.e., the 120 Hz value which is used for Nyquist resolution), or the 50 Hz value (i.e., the 100 Hz value which is used for Nyquist resolution), is larger. In one embodiment, if both the 60 Hz value and the 50 Hz value are within 10% of each other, then it is assumed that the camera is operating under incandescent light. Operation will then continue with block 316.

It is to be noted that the use of the FFT is an algorithmic optimization, not a requirement. A discrete fourier transform may also be used in other implementations. The benefit of performing a discrete fourier transform is that one is not restricted to choosing a data set which consists of a power of two number of values even though the discrete fourier transform is more computationally intense than the FFT, it solves a particular problem, that of frequency smear.

When a digital time domain to frequency domain transform is performed, the input data will alias if the Nyquist sampling criteria is not met. There is a similar problem with the output spectra, where if the frequency in the data set is "between" two digital frequency values, frequency aliasing occurs, and the resulting spectrum appears smeared out. To avoid frequency smear, the discrete fourier transform may be used at the cost of additional computation. As the detection only has to be done once to determine the initial lighting conditions, it may be acceptable to use a more computationally intensive algorithm. The choice is a tradeoff between computation time and discrimination accuracy, but the use of the fast-Fourier-transform is not a requirement.

In step 316, based on the determination by detector unit 110 of whether the camera is operating under 60 Hz, 50 Hz, or incandescent-like conditions, integration time is set according.

Once the flicker frequency has been determined in step 314, detector unit 110 will output a signal that, in one embodiment, represents the flicker frequency. In another embodiment, detector unit 110 will output a signal that signals whether an incandescent, 50 Hz, or 60 Hz lighting system has been detected. If the light source is a non-flickering source, this would have been determined in step 314, above. The capture control unit then determines the proper integration time for the detected frequency.

In certain configurations, detector unit 110 determines the proper integration time based on the detected flick frequency. Then, detector unit 110 controls capture control unit 106 to capture at the determined frame rate. Thus, the implementation of the control of the frame rate capture can be done in several ways and not limited to a particular embodiment.

By outputting the actual frequency of the oscillation of the light source intensity, the present invention is not limited to eliminating flicker effects from captured video only in 50 Hz or 60 Hz systems. For example, in some extreme low light situations, where the only light source that is provided is from a user's computer monitor, flicker effects can be eliminated if the system outputs the actual frequency of the light detected. This is because most monitor have a refresh rate that begins from 60 Hz. For example, if a scene is illuminated from a monitor that has a refresh rate of 75 Hz, the camera has to be able to synchronize the video frame capture to the refresh rate of the monitor.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for electronic image capture, comprising:
   detecting a frequency of oscillating scene illumination by analyzing a frame captured by a photosensor array of an image sensor under said oscillating scene illumination, said frame being captured under a first integration time that yields similar values for first and second functions of integration time, said first and second functions representing the effect of oscillating illumination at substantially different first and second frequencies; and
   capturing a frame by the image sensor under said scene illumination, said frame being captured under a second integration time that is based on the detected frequency.

2. The method of claim 1 wherein the first and second frequencies are 50 Hz and 60 Hz.

3. The method of claim 2 wherein the first integration time is approximately 0.0132 seconds.

4. The method of claim 2 wherein the photosensor array is operated in a pipelined mode.

5. The method of claim 2 wherein each row of the photosensor array is integrated on a row by row basis.

6. The method of claim 1 wherein the frequency is detected by performing a time to frequency domain transformation on a plurality of frames captured by the photosensor array under said oscillating scene illumination.

7. The method of claim 6 wherein said detected frequency is that of an incandescent light source if the amplitude of the frequency domain transformation at points corresponding to said first and second frequencies are similar.

8. The method of claim 6 wherein said detected frequency is said first frequency if the amplitude of the frequency domain transformation at a point corresponding to said first frequency is substantially greater than the amplitude at a point corresponding to said second frequency.

9. An imaging system comprising:
   an image sensor having a photosensor array;
   a detector coupled to the image sensor to detect a frequency of flicker in a frame captured by the photosensor array, the detector to set an integration time of the image sensor to a first value that yields similar values from first and second flicker functions of time, said first and second flicker functions representing the effect of oscillating illumination at substantially different first and second frequencies; and
   a capture control unit coupled to the image sensor and the detector, to set the integration time of the image sensor to a second value that is based on the detected frequency.

10. The system of claim 9 wherein the first and second frequencies are 50 Hz and 60 Hz.

11. The system of claim 10 wherein the first value is approximately 0.0132 seconds.

12. The system of claim 10 wherein the image sensor is to operate the photosensor array in a pipelined mode.

13. The system of claim 10 wherein each row of the photosensor array is to be integrated on a row by row basis.

14. The system of claim 9 wherein the detector is to perform a time to frequency domain transformation on a plurality of frames captured by the photosensor array.

15. The system of claim 14 wherein the flicker detector is to set the detected frequency to be that of an incandescent light source if the amplitude of the frequency domain transformation at points corresponding to said first and second frequencies are similar.

16. The system of claim 14 wherein the flicker detector is to set said detected frequency to a first value if the amplitude of the frequency domain transformation at a point corresponding to the first frequency is substantially greater than the amplitude at a point corresponding to the second frequency.

17. An article of manufacture comprising:
   a machine-readable medium having data that, when accessed by a processor, configures an intergration time of an image sensor based on a first value that yields similar values for first and second functions of integration time, said first and second functions representing the effect of oscillating illumination at substantially different first and second frequencies, detects a frequency of oscillating scene illumination by analyzing a frame captured by the image sensor as configured according to the first value and under said oscillating scene illumination, and configures the integration time of the image sensor according to a second value that is based on the detected frequency.

18. The article of manufacture of claim 17 wherein the medium has data that defines the first and second frequencies as 50 Hz and 60 Hz.

19. The article of manufacture of claim 18 wherein the medium has data that defines the first integration time as approximately 0.0132 seconds.

20. The article of manufacture of claim 17 wherein the medium has data that, when accessed by the processor, detects the frequency by performing a time to frequency domain transformation on a plurality of frames captured by the photosensor array under said oscillating scene illumination.

21. The article of manufacture of claim 20 wherein the medium has data that, when accessed by the processor, indicates the detected frequency as being that of an incandescent light source if the amplitude of the frequency domain transformation at points corresponding to said first and second frequencies are similar.

22. The article of manufacture of claim 20 wherein the medium has data that, when accessed by the processor, indicates the detected frequency as being said first frequency if the amplitude of the frequency domain transformation at a point corresponding to said first frequency is substantially greater than the amplitude at a point corresponding to said second frequency.

* * * * *

UNITED STATES PATENT AND TRADEMARK OFFICE
CERTIFICATE OF CORRECTION

PATENT NO. : 6,771,305 B2
DATED : August 3, 2004
INVENTOR(S) : Smith et al.

It is certified that error appears in the above-identified patent and that said Letters Patent is hereby corrected as shown below:

Column 8,
Line 67, delete "intergration" and insert -- integration --.

Signed and Sealed this

Twelfth Day of October, 2004

JON W. DUDAS
*Director of the United States Patent and Trademark Office*